Feb. 2, 1926.

J. HARRIS

SYNCHRONOUS INDUCTION MOTOR

Filed April 16, 1925

1,571,199

INVENTOR
Jesse Harris
BY
ATTORNEY

Patented Feb. 2, 1926.

1,571,199

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

SYNCHRONOUS INDUCTION MOTOR.

Application filed April 16, 1925. Serial No. 23,568.

*To all whom it may concern:*

Be it known that I, JESSE HARRIS, a citizen of the United States, residing at La Fayette, in the county of Tippecanoe and the State of Indiana, have invented a certain new and useful Improvement in Synchronous Induction Motors, of which the following is a full, clear, concise, and exact description.

My invention relates to synchronous induction motors employing armatures of non-magnetic metal revolving in inductive relation to a magnetic field produced by a winding which is preferably located upon a field core.

In practicing my invention, the armature carries a plurality of magnetizable bodies which are so positioned upon the armature that those of said bodies which are nearing and next the poles are at unequal distances from the respective polar axes which they are nearing and next and also from the axes of the shading coils which are preferably disposed about the poles with each extending in the direction of rotation of the armature further upon one side of the axis of the associate pole than the other. My improved motor has a speed that is independent of a wide range of voltage and a considerable change in load, while synchronizing or keeping in step with the frequency of the operating current.

Figure 1:
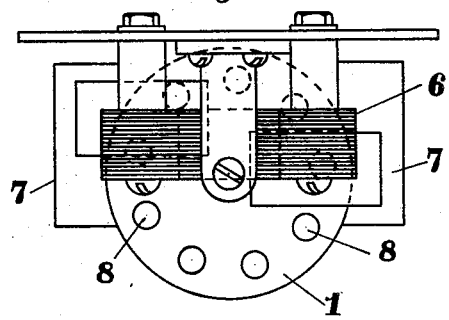
Figure 3:
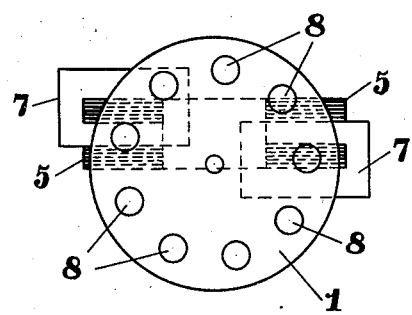
Figure 2:
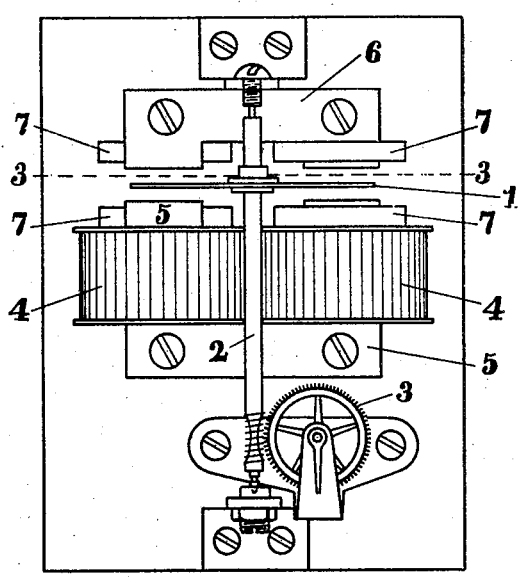
Figure 4:
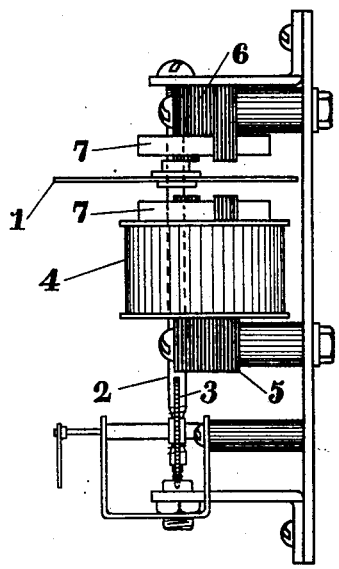

The invention will be fully explained in connection with the accompanying drawing in which Fig. 1 is a plan view of the preferred embodiment of my improved motor; Fig. 2 is a front view thereof; Fig. 3 is a sectional view on line 3—3 of Fig. 1; and Fig. 4 is a side view.

The armature 1 is shown in the form of a disc carried upon an upright spindle 2 which is geared or otherwise in driving relation to a load, of which a part 3 of one form of load is illustrated. Said armature is formed of non-magnetic metal, preferably copper. This armature rotates in a magnetic field produced by two field coils 4 that are wound upon the sides of a U-shaped magnetic core 5 disposed upon one side of and perpendicularly to the disc armature. The magnetic circuit of the motor is completed by the U-shaped magnetic body 6 disposed perpendicularly to and on the other side of the disc armature and in the plane of the core 5. A shading coil 7 is placed upon each side or limb of each core 5, 6, each of these coils 7 extending in the same circular direction (the direction of rotation of the armature) further upon one side of the axis of the associated pole from the other.

A circular row of magnetizable bodies 8 is carried by and coaxial with the armature, these bodies being preferably inserted within the armature. The magnetizable bodies 8 are so relatively positioned upon the armature that those of said bodies which are nearing and next the poles are at unequal distances from the respective geometrical polar axes, which they are nearing and next.

The armature functions in two ways. The copper disc reacts inductively and produces torque as in any induction motor provided with shading coils, whereas each iron insert takes a position central to the flux of the field pole to which it is turned. If such insert were short of the center of the pole, (due to a weak field), when the flux of that pole reached its maximum, the insert would be drawn ahead increasing the speed correspondingly. If the insert were given a tendency to go beyond the center of the pole, (due to a strong field), the insert would be attracted backwards by the waxing flux and the speed retarded correspondingly. I have experimentally demonstrated that this motor has a speed independent of voltage over a wide range and a considerable change of load while synchronizing with the frequency of the current. The motor is self-starting.

Having thus described my invention, I claim:

1. A synchronous motor including an armature formed of non-magnetic metal mounted to turn; a field winding having a magnetic core and presenting poles to said armature upon opposite sides of its axis; shading coils disposed about said poles and each extending in the direction of rotation further upon one side of the axis of the associate pole than the other; and a group of magnetizable bodies carried by the armature which has said magnetizable bodies so disposed thereon that the bodies which are nearing and next the poles are at unequal distances from the respective polar axes which they are nearing and next.

2. A synchronous induction motor including an armature formed of non-magnetic metal mounted to turn; a field winding having a magnetic core and presenting poles to said armature upon opposite sides of its axis;

shading coils disposed about said poles; and a group of magnetizable bodies carried by the armature which has said magnetizable bodies so disposed thereon that the bodies which are nearing and next the poles are at unequal distances from the respective polar axes which they are nearing and next.

3. A synchronous induction motor including an armature formed of non-magnetizable metal mounted to turn; a field winding presenting poles to said armature upon opposite sides of its axis; and a group of magnetizable bodies carried by the armature which has said magnetizable bodies so disposed thereon that the bodies which are nearing and next the poles are at unequal distances from the respective polar axes which they are nearing and next.

In witness whereof, I hereunto subscribe my name.

JESSE HARRIS.